US009462549B2

United States Patent
Alon et al.

(10) Patent No.: US 9,462,549 B2
(45) Date of Patent: Oct. 4, 2016

(54) SYSTEMS AND METHODS FOR OPTIMIZING POWER CONSUMPTION ASSOCIATED WITH PROCESSING GROUP ADDRESSED MESSAGES

(71) Applicants: Ayelet Alon, Herzliya (IL); Rafi Ben-Tal, Yokneam (IL)

(72) Inventors: Ayelet Alon, Herzliya (IL); Rafi Ben-Tal, Yokneam (IL)

(73) Assignee: Intel Corporation, Santa Clara, CA (US)

( * ) Notice: Subject to any disclaimer, the term of this patent is extended or adjusted under 35 U.S.C. 154(b) by 118 days.

(21) Appl. No.: 14/228,416

(22) Filed: Mar. 28, 2014

(65) Prior Publication Data

US 2015/0282079 A1 Oct. 1, 2015

(51) Int. Cl.
*H04W 52/02* (2009.01)
*H04W 4/06* (2009.01)
*H04W 40/00* (2009.01)

(52) U.S. Cl.
CPC ........... *H04W 52/0216* (2013.01); *H04W 4/06* (2013.01); *H04W 40/005* (2013.01); *Y02B 60/50* (2013.01)

(58) Field of Classification Search
CPC .............. H04W 52/00–52/0296; H04W 4/06; H04W 4/08; H04W 4/005; H04L 1/0001; H04L 1/0009
See application file for complete search history.

(56) References Cited

U.S. PATENT DOCUMENTS

| 8,102,790 | B1 * | 1/2012 | Trehus | H04W 52/0216 370/311 |
| 8,879,455 | B1 * | 11/2014 | Stephenson | H04H 20/423 370/311 |
| 8,971,229 | B1 * | 3/2015 | Yenganti | H04W 52/0216 370/311 |
| 2004/0165574 | A1 * | 8/2004 | Kakumaru | H04W 52/0216 370/349 |
| 2005/0254444 | A1 * | 11/2005 | Meier | H04W 4/06 370/312 |
| 2006/0187864 | A1 * | 8/2006 | Wang | H04W 48/12 370/311 |

(Continued)

FOREIGN PATENT DOCUMENTS

| KR | 1020090031692 A | 3/2009 |
| KR | 1020130139797 A | 12/2013 |

OTHER PUBLICATIONS

International Search Report and Written Opinion from PCT/US2015/018459 mailed Apr. 21, 2015. 9 Pages.

(Continued)

*Primary Examiner* — Warner Wong
(74) *Attorney, Agent, or Firm* — Sutherland Asbill & Brennan LLP

(57) ABSTRACT

Certain embodiments herein relate to optimizing power consumption associated with processing group addressed messages. For example, a station may receive a group addressed message (e.g., a broadcast or multicast message) from the access point. An expected time at which such group addressed messages may be received may be determined such that the group addressed messages may be processed without processing beacon frames, thereby consuming less battery power, and as a result, optimizing power consumption at wireless stations.

15 Claims, 6 Drawing Sheets

(56) References Cited

U.S. PATENT DOCUMENTS

| | | | | |
|---|---|---|---|---|
| 2007/0201413 | A1* | 8/2007 | Laine | H04L 12/189 |
| | | | | 370/338 |
| 2007/0297438 | A1* | 12/2007 | Meylan | H04W 52/0225 |
| | | | | 370/445 |
| 2008/0123577 | A1* | 5/2008 | Jaakkola | H04W 52/0225 |
| | | | | 370/311 |
| 2008/0151814 | A1* | 6/2008 | Jokela | H04W 74/04 |
| | | | | 370/328 |
| 2008/0181156 | A1* | 7/2008 | Ecclesine | H04W 52/0235 |
| | | | | 370/311 |
| 2008/0225768 | A1* | 9/2008 | Wentink | H04W 52/0216 |
| | | | | 370/311 |
| 2008/0298290 | A1* | 12/2008 | Wentink | H04W 52/0216 |
| | | | | 370/311 |
| 2009/0003252 | A1* | 1/2009 | Salomone | H04W 52/0229 |
| | | | | 370/311 |
| 2009/0097428 | A1* | 4/2009 | Kneckt | H04W 52/0216 |
| | | | | 370/311 |
| 2009/0232042 | A1* | 9/2009 | Kneckt | H04L 12/12 |
| | | | | 370/312 |
| 2010/0157863 | A1* | 6/2010 | Gong | G06F 1/3209 |
| | | | | 370/311 |
| 2010/0189021 | A1* | 7/2010 | He | H04W 52/00 |
| | | | | 370/311 |
| 2010/0265864 | A1* | 10/2010 | He | H04W 68/025 |
| | | | | 370/311 |
| 2010/0296495 | A1* | 11/2010 | Iino | H04L 12/46 |
| | | | | 370/338 |
| 2012/0176949 | A1 | 7/2012 | Meylan et al. | |
| 2012/0182815 | A1* | 7/2012 | Jeon | G06F 11/1048 |
| | | | | 365/191 |
| 2012/0263086 | A1* | 10/2012 | Liu | H04W 52/0216 |
| | | | | 370/311 |
| 2013/0235773 | A1 | 9/2013 | Wang et al. | |
| 2014/0036746 | A1* | 2/2014 | Mannemala | H04W 76/048 |
| | | | | 370/311 |
| 2014/0119268 | A1* | 5/2014 | Chu | H04W 74/04 |
| | | | | 370/312 |
| 2014/0185437 | A1* | 7/2014 | Park | H04W 28/0231 |
| | | | | 370/230 |
| 2015/0103727 | A1* | 4/2015 | Zhang | H04L 12/1854 |
| | | | | 370/312 |
| 2015/0156722 | A1* | 6/2015 | Kim | H04W 74/08 |
| | | | | 370/311 |
| 2015/0223168 | A1* | 8/2015 | Bhanage | H04W 52/0229 |
| | | | | 370/311 |

OTHER PUBLICATIONS

Office Action from Taiwan Application No. 104104769 mailed Apr. 20, 2016. (2 pgs., including 1 pgs. translation).

* cited by examiner

SYSTEMS AND METHODS FOR OPTIMIZING POWER CONSUMPTION ASSOCIATED WITH PROCESSING GROUP ADDRESSED MESSAGES

BACKGROUND

Wireless access points may transmit beacon frames that carry information about the network over which the beacon frame is transmitted. Wireless stations that receive a beacon frame may process the beacon frame to obtain information about the network. In existing systems, stations that receive the beacon frame may be expected to process the entire beacon frame to identify a pending message (e.g., one or more group addressed frames), and further expected to remain active until the pending message is received and processed. Stations that remain active for such a duration consume an inefficient amount of battery power for powering the stations, and may fail to meet power consumption targets directed at conserving power provided by such batteries.

BRIEF DESCRIPTION OF THE FIGURES

The detailed description is set forth with reference to the accompanying figures. In the figures, the left-most digit(s) of a reference number identifies the figure in which the reference number first appears. The use of the same reference numbers in different figures indicates similar or identical items.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art.

DETAILED DESCRIPTION

Certain embodiments herein relate to, among other things, optimizing power consumption associated with processing group addressed messages. A wireless station may communicate with an access point and/or other wireless computing devices over various types of wireless networks, such as WiFi, WiFi Direct, etc. For example, a station may receive a group addressed message (e.g., a broadcast or multicast message) from the access point. An expected time at which such group addressed messages may be received may be determined such that the group addressed messages may be processed without processing beacon frames, thereby consuming less battery power, and as a result, optimizing power consumption at wireless stations. The following descriptions provide illustrations and examples related to accomplishing such optimization.

Figure 1:
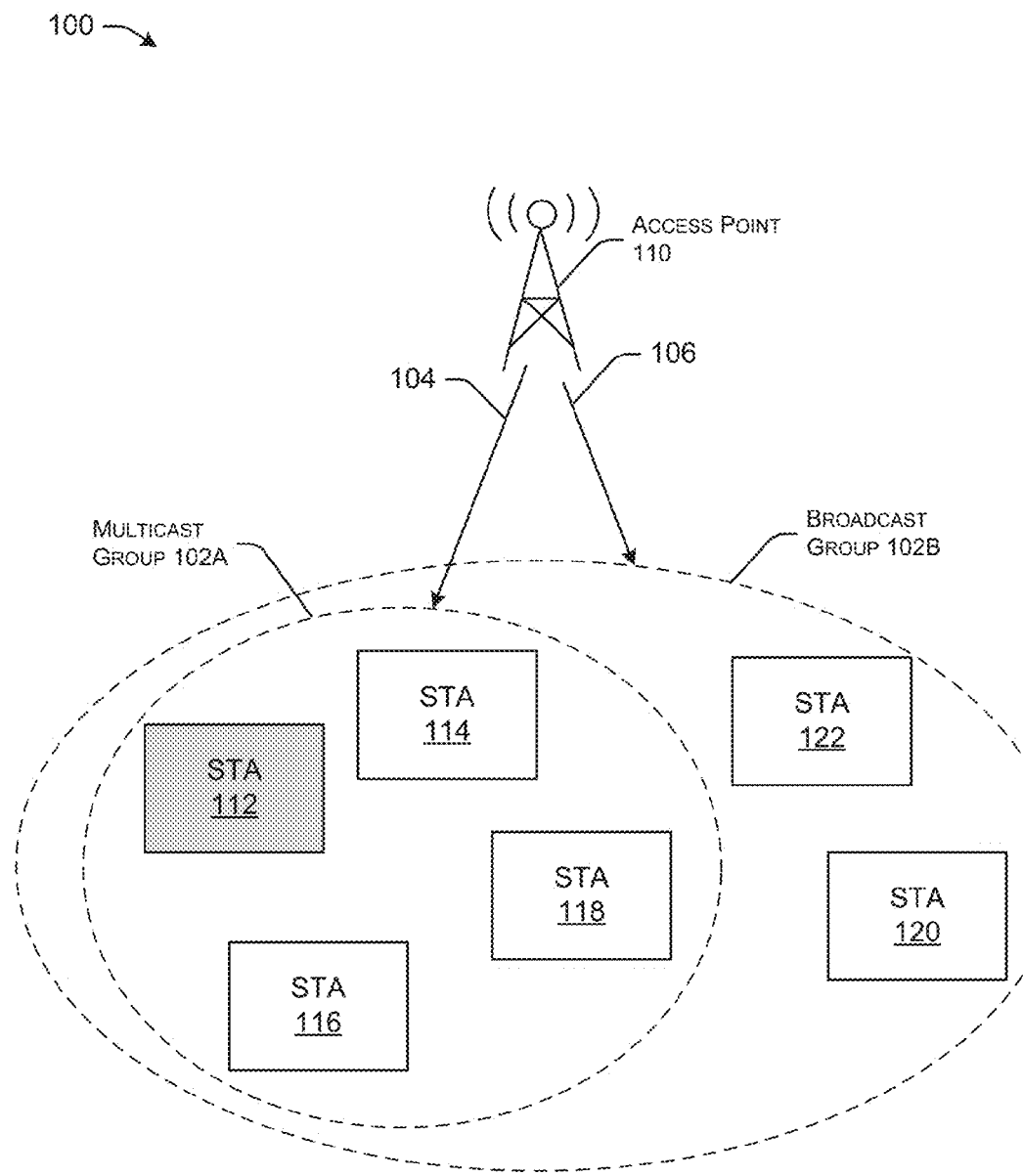
FIG. 1 illustrates an example wireless network over which an access point may communicate messages to multiple stations for processing on a wireless network, according to an embodiment of the disclosure.

FIG. 1 depicts an example wireless network over which an access point may communicate messages to multiple stations for processing on a wireless network, according to an embodiment of the disclosure. The access point and the station may be WiFi-enabled devices communicating over a WiFi network, in certain embodiments herein. As an example, a group addressed message, or one or more frames included in the group addressed message, may be communicated. As used herein, such a group addressed message may include a broadcast message, which may be sent to all stations in communication with an access point, or a multicast message, which may be sent to a subgroup of stations in communication with the access point. As an example, the access point 110 may send a broadcast message 106 to the stations 112, 114, 116, 118, 120, and 122. The access point 110 may also, or as an alternative, send a multicast message 104 to stations 112, 114, 116, and 118, which may represent a subgroup of all stations shown in FIG. 1.

The access point 110 may also send an individually addressed message, or a message that is sent from the access point 110 directly to a station. For example, the access point 110 may send an individually addressed message directly to the station 114, or any other station shown in FIG. 1.

The access point 110 may also receive information from the stations shown in FIG. 1. Such information may include status information associated with a power state of the device, such as power save mode or active mode (or otherwise not in power save mode), among other states. In FIG. 1, station 112 is shaded to illustrate that it is in power save mode, while the remaining stations 114, 116, 118, 120, and 122 are not shaded, and hence, are in active mode.

When at least one station is in power save mode, the beacon messages 104 and 106 transmitted from the access point 110 may include certain information that may facilitate optimized power consumption. Stations that receive the beacon frame 104 or 106 may process one or more fields or information elements within the frame to identify various information such as, but not limited to, a BSS timing synchronization functions (TSF) timestamp, beacon interval and traffic indication map (TIM) element, which may be used to determine the target beacon transmission time (TBTT) and the expected beacon time (e.g., expected time of receipt); an expected time for receiving a beacon including a Delivery Traffic Indication Message (DTIM), which may occur within a DTIM count, indicating how many beacons frames appear before the next DTIM, and every DTIM period, indicating the number of beacon intervals between successive DTIMs (e.g., once every two beacon transmissions); and an indication of whether a group addressed or individually addressed message is expected to be received. Such information may be used to schedule a time to wake up and process a group addressed message. The station may enter power save mode (or doze) until the scheduled time occurs, thereby optimizing power consumption, or put another way, conserving battery power. Examples of such processing will be described in greater detail below.

In the manner described above, an expected time for receiving a DTIM beacon may be based at least in part on an analysis of the beacon frame. The analysis may include determining an interval between successive DTIM beacons. The DTIM period field may indicate the number of beacon intervals between successive DTIMs. The analysis may further include determining a counter to the next DTIM beacon. The DTIM count field may indicate how the number of beacon frames (including the current frame, in at least one configuration) appear before the next DTIM. In one configuration, a DTIM count of zero (0) may indicate that the current TIM is a DTIM. The DTIM period and the DTIM count may be defined in the 802.11 standard.

The above descriptions in FIG. 1 are for purposes of illustration and are not meant to be limiting. Numerous other descriptions, configurations, examples, etc., may also exist. For example, fewer or more than the number of stations and access points shown in FIG. 1 may exist. Also, fewer or more stations may exist in the multicast group 102a. More multicast groups 102a may also exist.

Figure 2:
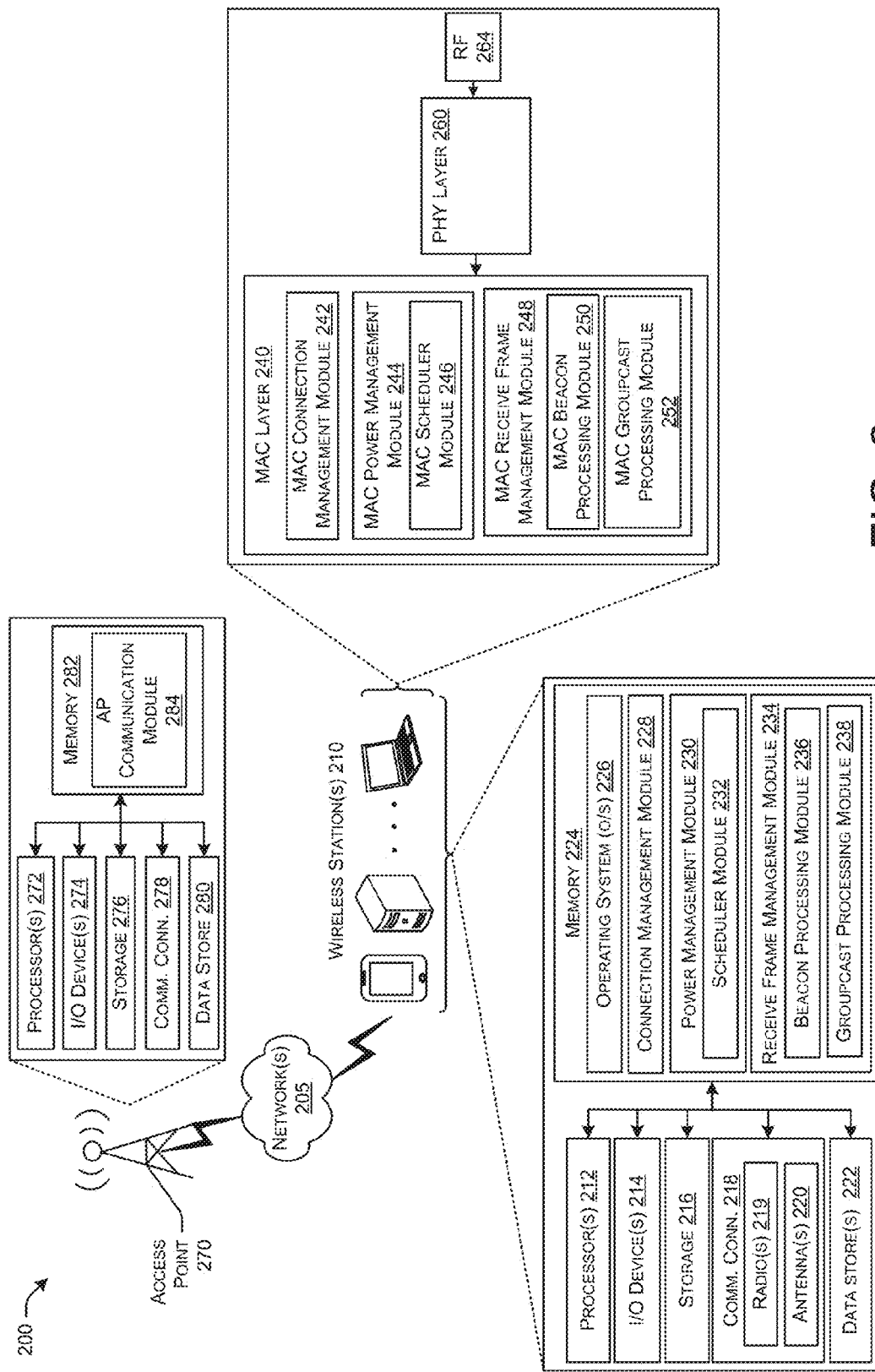
FIG. 2 illustrates a block diagram of an example computing environment for optimizing power consumption associated with processing group addressed messages, according to an embodiment of the disclosure.

FIG. 2 depicts a block diagram of an example computing environment 200 for optimizing power consumption associated with processing group addressed messages, according to an embodiment of the disclosure. The example computing environment 200 may include, but is not limited to, a wireless station 210 (also referred to as station 210) and an access point 270. Although only one station 210 and access point 270 are shown, more may exist in other examples, such as that illustrated in FIG. 1. An access point 270 may communicate with stations 210 over the one or more networks 205. For example, the access point 270 may send beacon frames, group addressed frames, individually addressed frames, etc., to the stations 210. The stations 210 may also send status information to the access point 270, as described above.

As used herein, the term "device" may refer to any computing component that includes one or more processors that can be configured to execute computer-readable, computer-implemented, or computer-executable instructions. Example devices can include client-type devices, output-type devices, wearable devices, wireless stations (e.g., the station 210), access points (e.g., the access point 270), personal computers, server computers, server farms, digital assistants, smart phones, personal digital assistants, digital tablets, smart cards, Internet appliances, application-specific circuits, microcontrollers, minicomputers, transceivers, kiosks, or other processor-based devices. The execution of suitable computer-implemented instructions by one or more processors associated with various devices may form special purpose computers or other particular machines that may implement or facilitate optimized power consumption associated with processing group addressed messages.

At least a portion of the devices shown in FIG. 2 may include a radio receiver (not shown). A physical layer interface in the radio receiver may include a radio frequency (RF) unit that may be configured to provide for reception of one or more RF signals. According to one configuration, the RF unit may include an amplifier, a mixer, a local oscillator, and so forth. The RF unit may be implemented as discrete electronic components, integrated circuits, software-defined radio, or a combination thereof, according to various configurations. At least a portion of the devices in FIG. 2 may also include a radio transmitter that may enable the devices to send one or more RF signals to one another. In some configurations, the devices may include a radio transceiver that may receive and send RF signals. The transceiver (or the receiver and/or the transmitter) may be coupled to one or more antennas.

Various types of networks 205 may enable communication between the computing devices shown in FIG. 2. Such networks may include any number of wired or wireless networks. In some embodiments, other networks, intranets, or combinations of different types of networks may be used including, but not limited to, WiFi networks, WiFi Direct networks, NFC networks, Bluetooth® networks, the Internet, intranets, cable networks, cellular networks, landline-based networks, radio networks, satellite networks, other short-range, mid-range, or long-range wireless networks, or other communication mediums connecting multiple computing devices to one another.

Certain embodiments herein may relate to the transmission of non-directed frames. Such non-directed frames may be sent by an access point (e.g., the access point 270) when at least one wireless station is in power save mode. Wireless stations herein may be configured to wake up at a scheduled time to receive the non-directed frames. Communication of non-directed frames, such as group addressed frames, may be in accordance with 802.11 specifications.

The stations 210 and the access point 270 may include one or more processors configured to communicate with one or more memory devices and various other components or devices. For example, the station 210 may include one or more processors 212, one or more input/output (I/O) devices 214, storage 216, one or more communication connections 218, and one or more data stores 222. The one or more processors 212 may be implemented as appropriate in hardware, software, firmware, or a combination thereof. With respect to the access point 270, the one or more processors 272 may be the same or at least similar to the processor 212 associated with the station 210.

The memory 224 associated with the station 210 may store program instructions that are loadable and executable on the associated processor 212, as well as data generated during the execution of these programs. Depending on the configuration and type of the station 210, the memory 224 may be volatile, such as random access memory (RAM), static random access memory (SRAM), dynamic random access memory (DRAM); or non-volatile, such as read-only memory (ROM), Electrically Erasable Programmable Read-Only Memory (EEPROM), flash memory, etc. With respect to the access point 270, the memory 282 may be the same or at least similar to the memory 224 associated with the station 210.

The storage 216 associated with the station 210 may include removable and/or non-removable storage including, but not limited to, magnetic storage, optical disks, and/or tape storage. The disk drives and their associated computer-readable media may provide non-volatile storage of computer-readable instructions, data structures, program modules, and other data for the station 210. With respect to the access point 270, the storage 276 may be the same or at least similar to the storage 216 associated with the station 210.

In any instance, the memory 224 and 282, and the storage 216 and 276, both removable and non-removable, are all examples of computer-readable storage media. For example, computer-readable storage media may include volatile and non-volatile, removable and non-removable media implemented in any method or technology for storage of information such as computer-readable instructions, data structures, program modules, or other data.

The I/O devices 214 associated with the station 210 may enable a user to interact with the station 210 to, among other things, view and/or interact with information transmitted by the access point 270, such information originating from another station or computing device, in certain embodiments. The I/O devices 214 may include, but are not limited to, a keyboard, a mouse, a pen, a voice input device, a touch input device, a gesture detection or capture device, a display, a camera or an imaging device, speakers, and/or a printer. With respect to the access point 270, the I/O devices 274 may be the same or at least similar to the I/O devices 214 associated with the station 210.

The one or more communication connections 218 associated with the station 210 may allow the station 210 to communicate with other devices, such as the access point 270, via the one or more wireless and/or wired networks 205. In one embodiment, the communication connections 218 may include one or more antennas 220 and one or more radios 219, which may include hardware and software for sending and/or receiving wireless signals over the various types of networks 205 described above. With respect to the access point 270, the communication connections 278 may be the same or at least similar to the communication connections 218 associated with the station 210. For example, the communication connections 278 may include one or more radios and antennas (not shown) that may enable the access point 270 to receive and/or send (e.g., route) wireless signals to the station 210.

The one or more data stores 222 associated with the station 210 may store lists, arrays, databases, flat files, etc. In some implementations, the data stores 222 may be stored in a memory external to the station 210 but may be accessible via one or more networks, such as with a cloud storage service. The data stores 222 may store information that may facilitate enabling optimized power consumption associated with processing group addressed messages, as described herein. The stored information may include information that may be used to schedule a wake-up time for receiving a group addressed message. Such information may include, but is not limited to, a beacon interval, which may be used to determine an expected time for receiving a beacon; a DTIM count and a DTIM period, which may be used to determine an expected time for receiving a DTIM beacon; a beacon duration; a DCF Interframe Space (PIFS) period, which may occur after a beacon frame but before a group addressed frame; a type of message expected, for example, group addressed or individually addressed; a current status associated with the station, such as power save mode, active mode (e.g., non-power save mode), etc.

The stored information may also include information associated with the access point 270 to which the station 210 is connected. Such information may include, but is not limited to, a Media Access Control (MAC) address, or a corresponding basic service set identification (BSSID) or service set identifier (SSID), an indication of a current connection state of the station 210 with respect to the access point 270, an operating class indicating a frequency band at which the access point 270 is currently operating, or an indication of a channel number on which the access point 270 is currently operating. The stored information may further include information that may be used to generate frames for transmitting packets over the network 205, such as frame size, delimiters, etc.

Turning to the content of the memory 224, the memory 224 may include, but is not limited to, an operating system (O/S) 226 and various program modules to implement or facilitate the processes described herein. Such program modules may include a connection management module 228, a power management module 230 (which may include a scheduler module 232), and a receive frame management module 234 (which may include a beacon processing module 236 and a groupcast processing module 238). Each of these modules may be implemented as individual modules that provide specific functionality associated with optimizing power consumption associated with processing group addressed messages, as described herein. Alternatively, one or more of the modules may perform all or at least some of the functionality associated with the other modules.

The operating system 226 may refer to a collection of software that manages computer hardware resources and provides common services for computer programs to enable and facilitate operation of such programs. Example operating systems may include UNIX, Microsoft Windows, Apple OS X, iOS, Android, Chrome OS, etc.

The connection management module 228 may establish a connection for the station 210 to communicate with other devices, such as the access point 270. The connection management module 228 may also perform various maintenance functions associated with the connection. For example, the connection management module 228 may implement changes in the operation of the station 210 based on adjustments in the network 205. Such changes may be communicated from the access point 270 to the station 210 via a beacon frame, in one embodiment. The frame analyzer module, as will be described below, may process the beacon frame to identify such changes, and send information associated with the changes to the connection management module 228 for implementing the changes, in one embodiment.

The power management module 230 may perform functions associated with managing power consumption by the station 210. Such functions may include determining when to enter power save mode for (or power down) the station 210, and when to cause the station 210 to wake up from power save mode, among other functions. In one embodiment, the power management module 230 may enter power save mode at a time prior to reception of a beacon frame, and may cause the station 210 to wake up after the reception of a beacon frame, such as a DTIM beacon frame. Examples of such processing will be described in greater detail below. The functions provided by the power management module 230 may be facilitated by the scheduler module 232.

The scheduler module 232 may determine the wake-up time based at least in part on the expected time for receiving a DTIM beacon, the DTIM beacon duration, and the PIFS duration. In one example, upon receiving the DTIM information above from the beacon processing module 236, the scheduler module 232 may identify a PIFS duration (e.g., as stored in the data store 222), and add the DTIM beacon duration and the PIFS duration to the expected time for receiving the DTIM beacon to determine the time at which the station 210 should wake up to process a group addressed message. Consistent with such processing, a group addressed message may be expected to be received only immediately after a DTIM beacon (plus the PIFS duration) in instances in which at least one station (such as the station 112 in FIG. 1) is in power save mode. In this way, a group addressed message may be identified by using the DTIM beacon and PIFS information as described above, in one embodiment. In one embodiment, a station 210 may send an indication (e.g., via the power management module 230) that it is entering into, or is currently in, power save mode. In response, the station 210 may receive the DTIM beacon.

The scheduler module 232 may also schedule the station 210 to wake up to receive and process a beacon frame. As described above, such scheduling may be based on an expected receive time for a beacon frame as identified in a beacon frame by the beacon processing module 236.

The power management module 230 may schedule the station 210 to enter power save mode according to the schedule as determined by the scheduler module 232 above. For example, the power management module 230 may cause the station 210 to enter power save mode after a group addressed message or messages have been processed. In some embodiments, the power management module 230 may cause the station 210 to enter power save mode after the wake-up schedule has been determined. The power management module 230 may further cause the station 210 to wake up at the beginning of a group addressed message, such as the first group addressed message following the next DTIM beacon frame, after the last group addressed message following the previous DTIM beacon frame was processed, in one example.

The receive frame management module 234 may manage the process for receiving pending frames, such as beacon frames, group addressed frames, individually addressed frames, etc., from the access point 270. The receive frame management module 234 may manage the receipt of such information at expected times. In one embodiment, the receive frame management module 234 may send a request to the access point 270 for pending frames. The time at which the request is sent may be based on an expected time for receiving a beacon frame, as may be identified in timestamp and beacon interval fields of a beacon frame previously processed by the beacon processing module 236. For example, at a time that a beacon is expected, or prior to such time, the receive frame management module 234 may send a request for pending frames (e.g., group addressed frames) to the access point 270. The access point 270 may, in response, send the pending frames to the station 210. Such a process may facilitate the station 210 receiving group addressed messages according to the expected times indicated in a beacon frame received by the station 210 prior to receipt of the group addressed messages. In some embodiments, the access point 270 may send pending frames without receiving a request from the receive frame management module 234.

The beacon processing module 236 may process beacon frames to identify information in the beacon frames that may be used to schedule a wake-up for processing group addressed messages. In one embodiment, the beacon processing module 236 may parse information in the beacon field's information elements (IE). Such information may include the expected time for receiving a beacon and the duration of the beacon, the expected time for receiving a DTIM beacon and the duration of the DTIM beacon, an indication of whether a group addressed or individually addressed message is expected, etc. The beacon processing module 236 may also send information identified in a beacon frame to other program modules described herein. For example, upon identifying the above information associated with a beacon and DTIM beacon, the beacon processing module 236 may send such information to the scheduler module 232, which may use the information to schedule a time for the station 210 to wake up and process a group addressed message associated with a DTIM beacon, in one embodiment.

The groupcast processing module 238 may process group addressed frames associated with a group addressed message. Such processing may include reading one or more Presentation Protocol Data Units (PPDU's) in the group addressed frames until all or at least a portion of the PPDU's or data in the frames have been read or received.

FIG. 2 may also include another configuration for implementing the above functionality that includes a Media Access Control (MAC) layer 240 and a physical (PHY) layer 260 associated with the station 210. The MAC layer 240 may be a sublayer of the data link layer of the OSI model of computer networking and may provide addressing and channel access control mechanisms that enable the station 210 to communicate with other computing devices on the network 205. In so doing, the MAC sublayer may act as an interface between the logical link control (LLC) sublayer and the network's PHY layer 260. The MAC layer 240 may also emulate a full-duplex logical communication channel that may provide group addressed (e.g., broadcast or multicast) and unicast communication service.

In one embodiment, a medium access controller in the MAC layer may include one or more hardware components that implement at least a portion of the functionality described in FIG. 2. The medium access controller may include at least one processor and at least one memory. In one embodiment, the at least one memory may store computer-executable instructions for processing functions provided by the MAC connection management module 242, which may be the same or at least similar to the connection management module 228 of the station 210; the MAC power management module 244, which may be the same or at least similar to the power management module 230 of the station 210; the MAC beacon processing module 250, which may be the same or at least similar to the beacon processing module 236 of the station 210; the MAC scheduler module 246, which may be the same or at least similar to the scheduler module 232 of the station 210; the MAC receive frame management module 248, which may be the same or at least similar to the receive frame management module 234 of the station 210; and the MAC groupcast processing module 252, which may be the same or at least similar to the groupcast processing module 238 of the station 210. The functions associated with MAC groupcast processing module 252 may be implemented in hardware and/or software.

The PHY layer 260 may include various networking hardware transmission technologies and may define a means for transmitting raw bits to other computer devices. In so doing, the PHY layer 260 may translate logical communication requests from the data link layer into hardware-specific operations to cause transmission or reception of electronic signals. Such signals may be converted into radio frequency signals for transmission to one or more other computing devices on the network 205 via a RF transmission device 264. For example, the RF transmission device 264 may receive and/or transmit one or more PPDU's.

The station 210 may also include a modulator/demodulator, which may convert received RF signals to analog, and may convert the analog signals to RF signals for transmission. One or more antennas, such as the one or more antennas 220, may provide the air interface to transmit and receive RF signals.

As described, FIG. 2 may also include an access point 270. The memory 282 of the access point 270 may include an access point (AP) communication module 284. The AP communication module 284 may configure the access point 270 to receive and/or send information to the station 210 and/or other computing devices (not shown) on the network 205. For example, the AP communication module 284 may also receive an indication from the station 210 to transmit pending frames as indicated in the TIM of a beacon. Upon receiving the indication the AP communication module 284 may transmit the pending frames. In other embodiments, the AP communication module 284 may transmit information to the station 210, as well as other stations on the network, according to a schedule indicated in a beacon transmission.

As another example, the AP communication module 284 may receive a respective status indication from one or more stations on the network 205. One such indication may include whether the station is in power save mode or active (e.g., non-power save) mode. Upon receiving an indication that at least one station is in power save mode, the AP communication module 284 may generate a beacon including a DTIM and assemble message frames such that a group addressed message follows the DTIM beacon. In one configuration, the group addressed frame may immediately follow the DTIM beacon or may immediately follow a PIFS duration after the DTIM beacon. In other non-limiting examples, the group addressed message may exist at any time after the DTIM beacon but before another beacon is transmitted. Group addressed messages may appear only after a DTIM beacon, in certain embodiments herein.

The above descriptions in FIG. 2 are for purposes of illustration and are not meant to be limiting. Numerous other descriptions, examples, configurations, etc., may exist in other embodiments.

Figure 3:
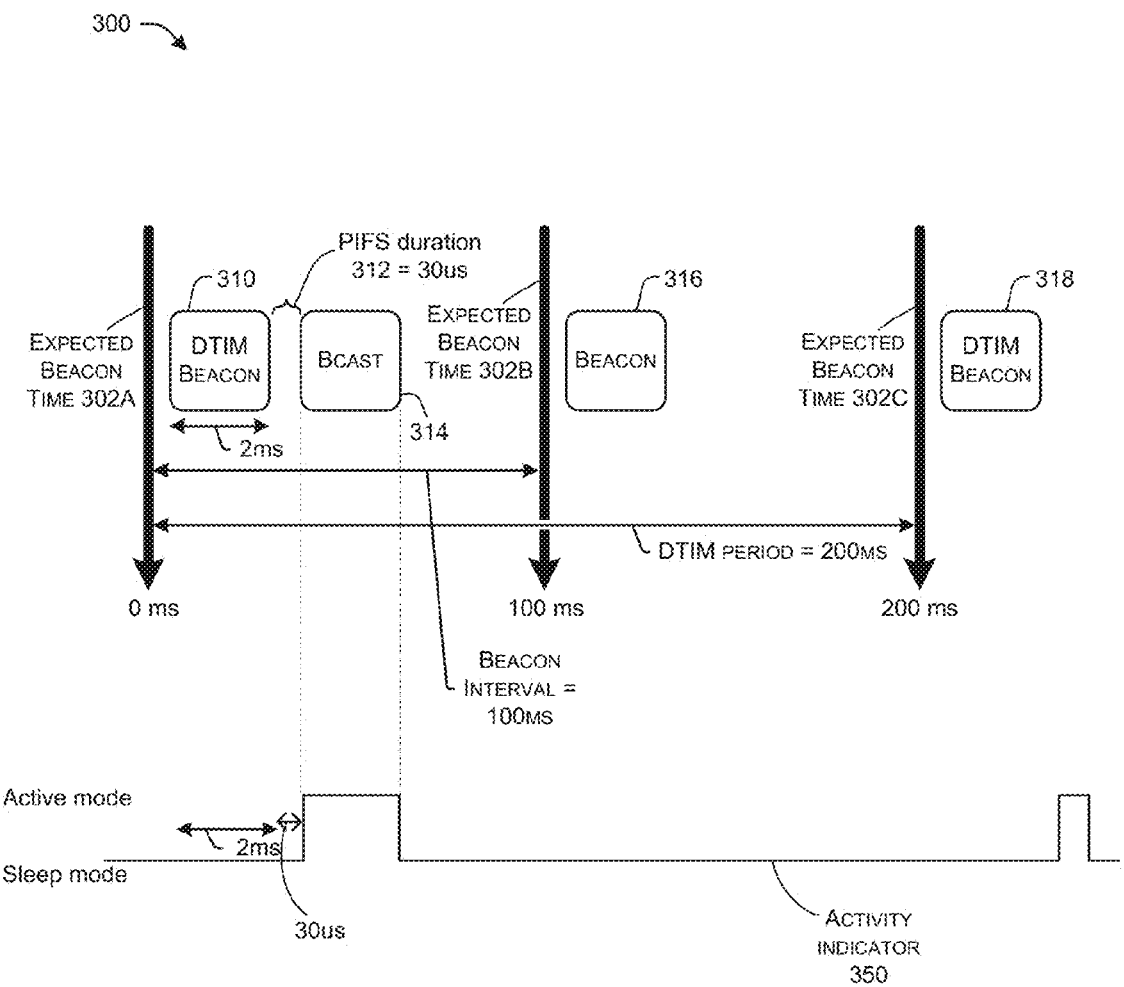
FIG. 3 illustrates an example diagram of processing a broadcast message received after a Delivery Traffic Indication Message (DTIM) beacon, according to an embodiment of the disclosure.

FIG. 3 depicts an example diagram 300 of processing a broadcast message received after a DTIM beacon, according to an embodiment of the disclosure. Such processing may be performed by the station 210 in FIG. 2, in one embodiment. As described above, a beacon message may have been previously processed to determine the expected time for receiving a beacon and a DTIM beacon, which may be based on beacon intervals and the TIM field of a previously processed beacon; the duration of the beacon and DTIM beacon; the type of message expected (e.g., group addressed or individually addressed), etc. Such information may be used to receive the broadcast message, as described below.

As shown in FIG. 3, a beacon may be expected at expected beacon time of 0.0 milliseconds (as indicated by expected beacon time 302a) and may have an interval of 100.0 milliseconds. Thus, a beacon (e.g., the beacon 316) may be expected once every 100.0 milliseconds (e.g., at 0.0 milliseconds as indicated by expected beacon time 302a, at 100.0 milliseconds as indicated by expected beacon time 302b, at 200.0 milliseconds as indicated by expected beacon time 302c, and so forth). An expected time for receiving the beacon may be determined based on the BSS timing synchronization functions (TSF) and beacon interval.

A beacon containing DTIM beacon 310 may be expected at 0.0 milliseconds. A period of the DTIM beacon may be two beacon intervals, which is 200.0 milliseconds as shown. Thus, a first DTIM beacon 310 may be expected at 0.0 milliseconds, and a second DTIM beacon 318 may be expected 200.0 milliseconds later. In this way, a DTIM beacon may exist at a fixed interval, such as once every two beacon intervals, twenty-five beacon intervals, or other number of beacon intervals.

An activity indicator 350 associated with a wireless station, such as the station 210 in FIG. 2, is also indicated in FIG. 3. The activity indicator 350 may illustrate times during which a station is in power save mode or in active mode with respect to the illustrated beacon and DTIM beacon transmissions. A line that is at the level of the "power save mode" indicator of the activity indicator 350 may be consistent with a station that is currently asleep or in power save mode. A line that is at the level of the "active mode indicator," which is spiked or increased the "power save mode" indicator, may be consistent with a station that is active or not in power save mode.

In certain embodiments herein, the group addressed messages may be transmitted only following DTIM beacon, when at least one station, such as the station 112 in FIG. 1, is in power save mode. An access point, such as the access point 110, may broadcast the DTIM beacon to stations on the network. When the DTIM beacon is received, a station may remain in power save mode, in certain embodiments herein, as illustrated by a level line on the activity indicator 350 underneath the DTIM beacon 310. When a broadcast 314 message or frame is received, the line may spike up to the active mode for the duration of the broadcast 314 message. Thus, a station herein may skip processing of the DTIM beacon 310 and wake up for processing the broadcast 314 message. Traditional systems may be required to process the DTIM beacon as well as the broadcast 314 message, in order to determine whether a message is expected or not expected.

A calculation may be performed to determine when to wake up for processing the broadcast 314. In one present example, the calculation may include adding the expected DTIM beacon time of 0.0 ms, the duration of the DTIM beacon of 2.0 ms, and PIFS duration 312 of 30.0 microseconds. Such values are for purposes of illustration only and are not meant to be limiting. As a non-limiting example, the PIFS duration may be 30.0 microseconds. Adding the values in the present example may yield 2.03 milliseconds. In embodiments in which a group addressed message immediately follows the PIFS duration, a station may wake up at 2.03 milliseconds, in the present example (0.0 ms+2.0 ms+30.0 μs). After processing the broadcast 314 message, the station may reenter power save mode, or sleep mode, as illustrated by the line of the activity indicator 350 being at the power save mode level. Processing may continue in such fashion such that the location of DTIM beacons may be leveraged to optimally process group addressed messages (e.g., without consuming power to process beacon frames).

The above descriptions in FIG. 3 are not meant to be limiting. Numerous other examples may exist. For example, the expected times of the beacons, intervals, interframe space duration, etc., may be different in other examples. As another example, although a broadcast message is described, a multicast message, or other types of messages, may also be received and processed in other examples.

Figure 4:
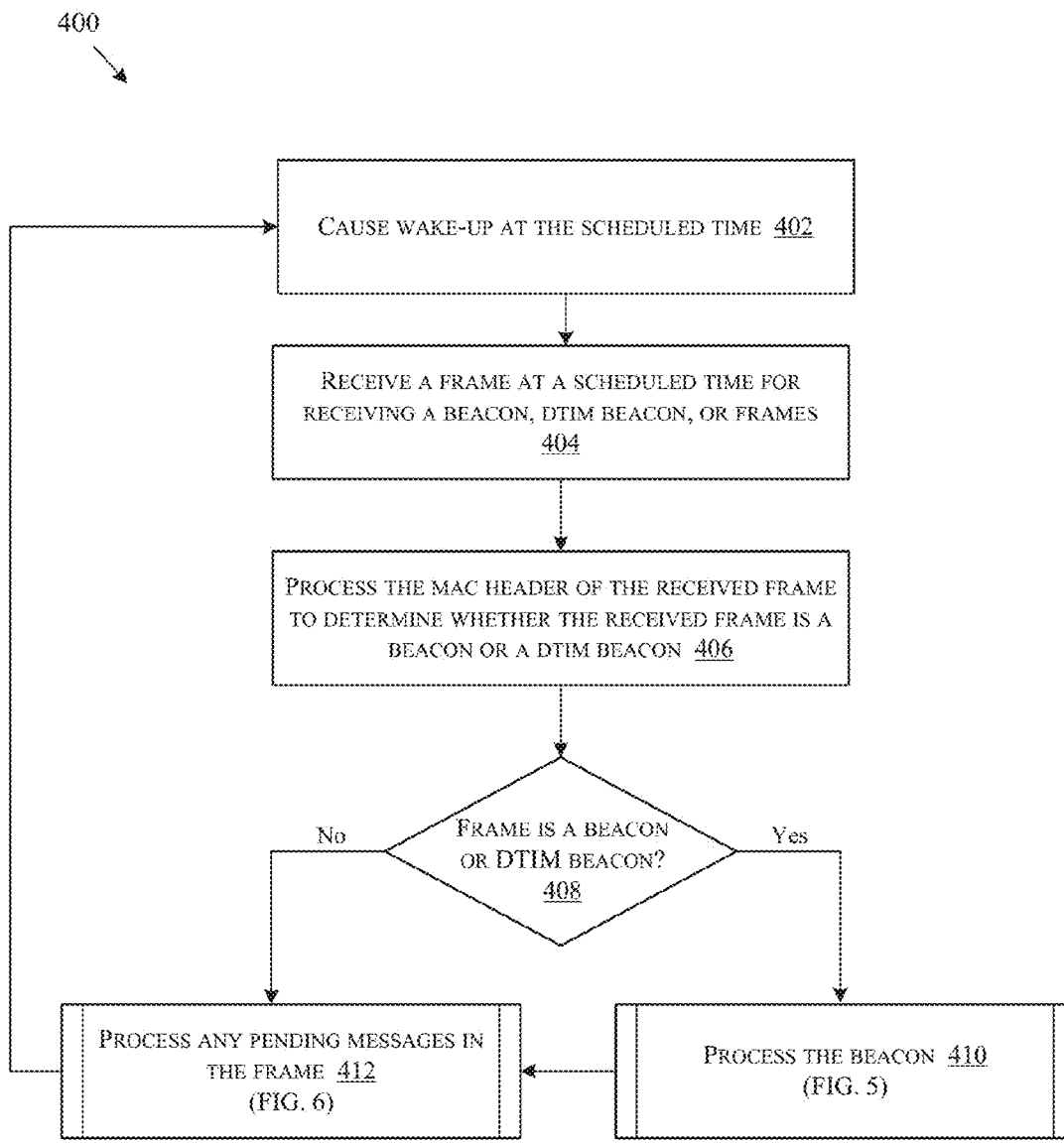
FIG. 4 illustrates a flow diagram of an example process for optimizing power consumption associated with processing a beacon or a group addressed message, according to an embodiment of the disclosure.

FIG. 4 depicts a flow diagram of an example process 400 for optimizing power consumption associated with processing a group addressed message, according to an embodiment of the disclosure. The example process 400 may be implemented by a station 210 in FIG. 2, in one embodiment. The example process may begin at block 402, where a wake-up may be caused (e.g., by the power management module 230) to wake the station up at a scheduled time for receiving a beacon, a DTIM beacon, or other frames (e.g., by the receive frame management module 234), at block 404.

At block 406, the MAC header of the received frame may be processed to determine whether the received frame is a beacon. If the received frame is not a beacon or DTIM beacon, as may be determined at block 408, then processing may continue to block 412, where any pending messages in the frame may be processed (e.g., by the groupcast processing module 238). Examples of processing any pending messages are described in FIG. 6. If the received frame is a beacon frame, then processing may continue to block 410, where the beacon may be processed (e.g., by the beacon processing module 236). Examples of processing the beacon are described in FIG. 5. After the processing in block 410, processing may continue to block 412, where any pending messages in the frame may be processed. Processing may thereafter return to block 402, where a wake can be caused at the scheduled time (e.g., the next scheduled time).

Figure 5:
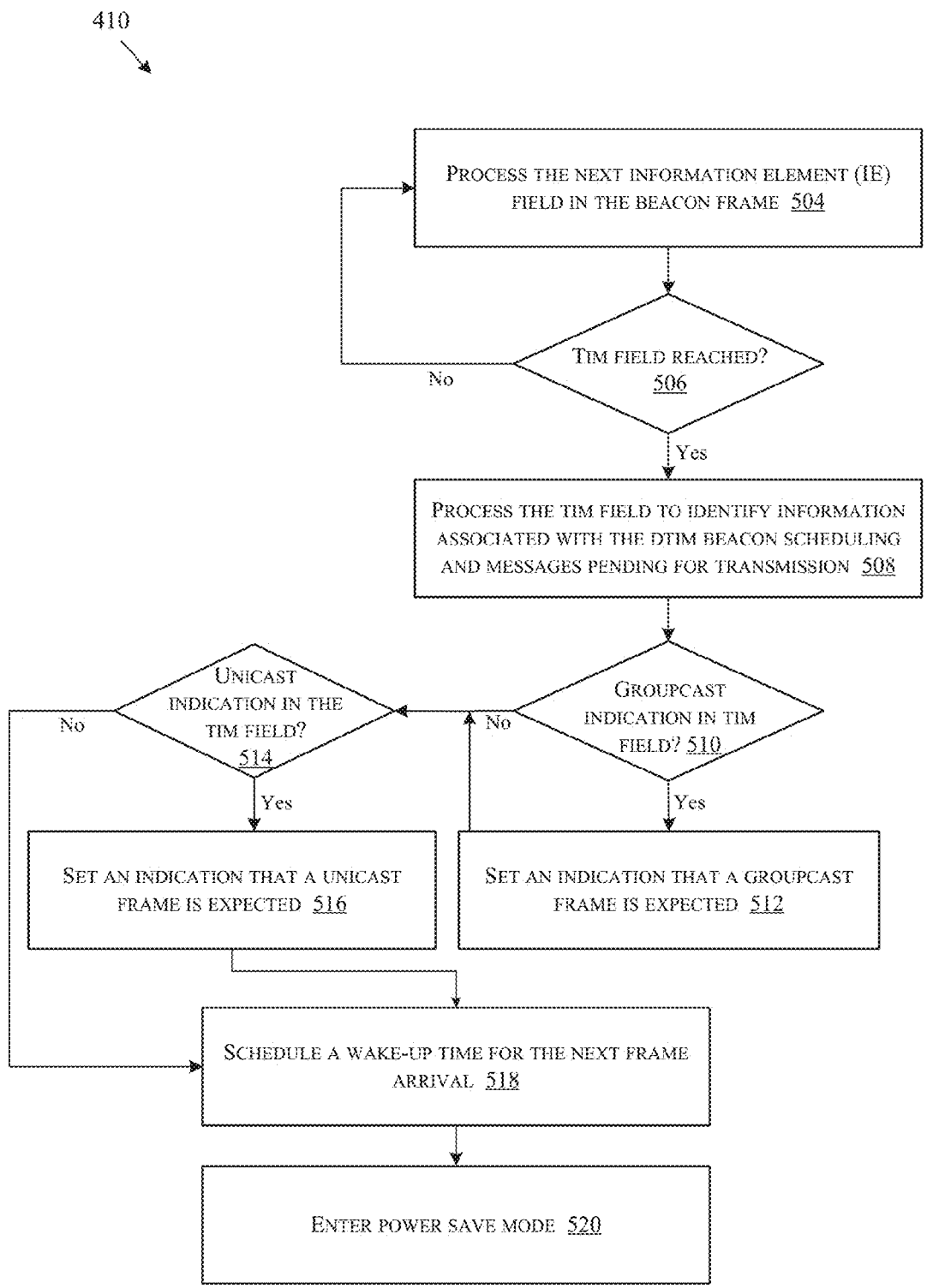
FIG. 5 illustrates a flow diagram of an example process for processing a beacon frame to facilitate determining a schedule for waking up to process a group addressed message, according to an embodiment of the disclosure.

Turning now to the example process 410 in FIG. 5 for processing a beacon, the next information element (IE) in the beacon may be processed, at block 504, until the TIM field is reached at block 506. If the TIM field is reached, then the TIM field may be processed to identify information associated with the DTIM beacon scheduling and messages pending for transmission at block 508.

If a groupcast indication is identified in the TIM field, at block 510, then an indication that a group addressed frame is expected may be set (e.g., by the power management module 230), at block 512. After setting the indication, or after determining that a groupcast indication is not in the TIM field, then a determination may be made as to whether a unicast indication is in the TIM field at block 514. If a unicast indication is identified in the TIM field, then an indication that an individually addressed frame is expected may be set at block 516. After identification of either a group addressed frame or an individually addressed frame, a wake-up time for the next frame arrival may be scheduled (e.g., by the scheduler module 232), at block 518, and the station may enter power save mode (e.g., via the power management module 230), at block 520. Processing may return to FIG. 4 at block 402, where a frame may be received at a scheduled time for receiving a beacon, a DTIM beacon, or frames.

Figure 6:
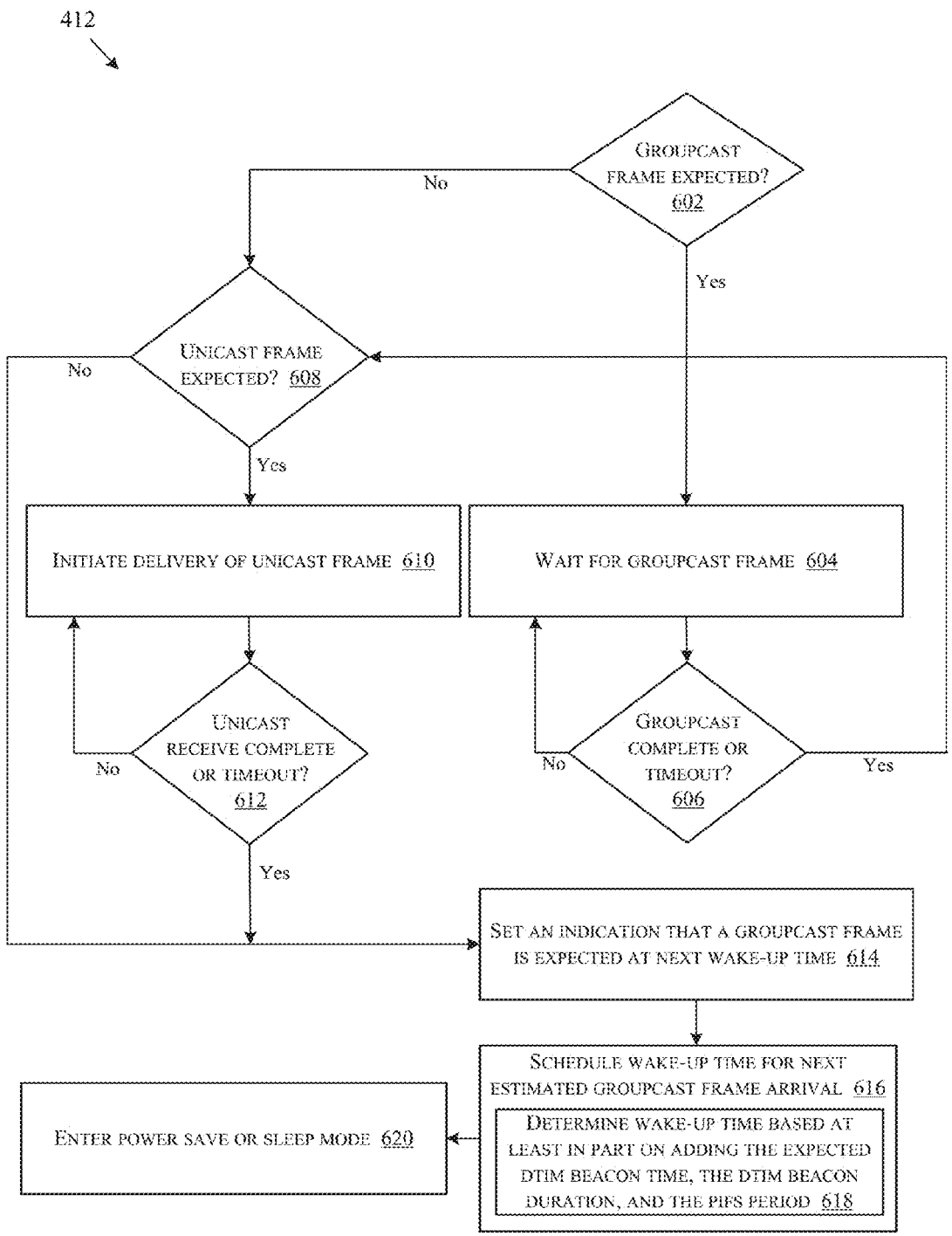
FIG. 6 illustrates a flow diagram of an example process for processing any pending group addressed or directed message, according to an embodiment of the disclosure.

FIG. 6 depicts a flow diagram of an example process 412 for processing any pending messages in a frame received at a scheduled time, according to an embodiment of the disclosure. The example process 412 may begin at block 602, where a determination may be made as to whether a group addressed frame (e.g., a groupcast frame) is expected. Such a determination may be based at least in part on whether a DTIM beacon is expected, in one embodiment.

As described herein, a group addressed message may be expected following a DTIM beacon, when at least one station (e.g., the station 112 in FIG. 1) is in power save mode. Upon receiving such an indication from a station, an access point in communication with the station (e.g., the access point 110 in FIG. 1) may include a traffic indication in the DTIM beacon in the frame and a group addressed message thereafter, (e.g., immediately thereafter, separated by an interframe space, separated by a PIFS duration in one embodiment). A DTIM beacon may therefore be present in the received frame (e.g., the beacon frame in FIG. 5) in such instances. In certain embodiments herein, a group addressed message may only appear after a DTIM beacon in such instances.

If a group addressed frame is expected at block 602, then a station may wait for the group addressed frame at block 604. The group addressed frame may be received (e.g., by the receive frame management module 234) until receiving the group addressed frame is complete or a timeout is reached (which may be any suitable value) at block 606. Thus, the expected group addressed frame may be received at block 606. An example of such processing is described in FIG. 6. If a group addressed frame is present (such as broadcast frame 314 in FIG. 3) in association with the station waking up, then the group addressed frame may be received and processed. In certain embodiments herein, it may be assumed that a group addressed frame will be present when the station wakes up. If a group addressed frame is present, then it may be received and processed. If a group addressed frame is not present, and an individually addressed frame is not expected, then the station may return to power save mode.

If receipt of the group addressed frame is complete at block 606, then an indication may be set that a group addressed frame is expected at the next wake-up time, at block 614. The wake-up time for the next estimated group addressed frame arrival may be scheduled (e.g., by the scheduler module 232) at block 618. Such a wake-up time may be based at least in part on adding the expected DTIM beacon time, the DTIM beacon duration, and the PIFS duration. Because the group addressed message or frame may appear immediately after the DTIM beacon and the PIFS duration, the time at which a station may wake-up to process the group addressed frame may be known. The station may enter the power save or sleep mode (e.g., via the power management module 230) after the schedule is determined, at block 620, in one embodiment.

Following the group addressed frame processing at block 606, then it may be determined whether an individually addressed frame (e.g., a unicast frame) is expected at block 608. If an individually addressed frame is not expected, then an indication may be set that a group addressed frame is expected at the next wake-up time at block 610, the next wake up may be scheduled at block 612 (including determining the wake-up time at block 614), and the station may enter power save mode at block 620. If an individually addressed frame is expected, then delivery of the individually addressed frame may be initiated at block 610, in certain embodiments. The individually addressed frame may be received (e.g., by the receive frame management module 234) until receiving the individually addressed frame is complete or a timeout is reached (which may be any suitable value) at block 612. If the individually addressed frame is complete or a timeout is reached, then an indication that a groupcast frame is expected may be set at the next wake-up time at block 614, followed by scheduling the next wake up, and followed by the station entering power save or sleep mode at block 620, in certain embodiments. Processing may return to FIG. 4 at block 402, where a frame may be received at a scheduled time for receiving a beacon, a DTIM beacon, or frames.

In certain embodiments herein, if a DTIM beacon is expected, then an indication that a group addressed frame is expected may be set irrespective of a determination of whether a TIM portion of a beacon indicates that a group addressed message is expected.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks.

As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

In an example embodiment, there is disclosed a method. The method may include receiving, by a computing device from a wireless access point, a beacon frame. The method may also include determining, by the computing device, an expected time for receiving a Delivery Traffic Indication Message (DTIM) beacon based at least in part on an analysis of the beacon frame. The analysis may include determining an interval between successive DTIM beacons and a counter to the next DTIM beacon. The method may further include scheduling, by the computing device, a wake-up time for processing a group addressed message based at least in part on the expected time for receiving the DTIM beacon and a duration of the DTIM beacon. The scheduled wake-up time may include a first scheduled wake-up time. Such a scheduled wake-up time may occur after the DTIM beacon associated with the group addressed message was broadcast.

The method may further include entering, by the computing device, into a power save mode after the scheduling, and waking up, by the computing device, at the scheduled wake-up time. The scheduled wake-up time occurs after the DTIM beacon associated with the group addressed message was broadcast. In one embodiment, the method may also include processing, by the computing device before entering into power save mode, an individually addressed frame. The scheduling may include adding, by the computing device, the expected time for receiving the DTIM beacon, the duration of the DTIM beacon, and a DCF Interframe Space (PIFS) duration to establish the wake-up time. The method may also include, after waking up, determining, by the computing device, that the group addressed frame is not present, and reentering power save mode after determining that the group addressed frame is not present.

The method may further include processing, by the computing device, the group addressed message and determining, by the computing device, a second scheduled wake-up time based at least in part on the interval between successive DTIM beacons. After processing the group addressed message, reentering, by the computing device, the power save mode until the second scheduled wake-up time is reached for processing a subsequent DTIM beacon.

The method may further include sending, by the computing device, an indication that the computing device is entering into power save mode, and after to sending the indication, receiving, by the computing device, the DTIM beacon.

The method may further include receiving, by the computing device, a data frame at the expected time for receiving a beacon frame, and determining, by the computing device, that the data frame is a beacon frame based at least in part on an analysis of a Media Access Control (MAC) header in the data frame.

In another example embodiment, there is disclosed a wireless device. The wireless device may include a receive frame management module configured to receive a beacon frame from a wireless access point. The wireless device may also include a power management module configured to determine an expected time for receiving a Delivery Traffic Indication Message (DTIM) beacon based at least in part on an analysis of the beacon frame. The analysis may include determining an interval between successive DTIM beacons and a counter to the next DTIM beacon. The wireless device may further include a scheduler module configured to schedule a wake-up time for processing a group addressed message based at least in part on the expected time for receiving the DTIM beacon and a duration of the DTIM beacon. The scheduled wake-up time may include a first scheduled wake-up time. Such a scheduled wake-up time may occur after the DTIM beacon associated with the group addressed message was broadcast.

The power management module may be further configured to enter into a power save mode after the scheduling, and waking up, by the computing device, at the scheduled wake-up time. The scheduled wake-up time occurs after the DTIM beacon associated with the group addressed message was broadcast, in one embodiment. In one embodiment, the wireless device may also include a groupcast processing module configured to process, before entering into power save mode, an individually addressed frame. The scheduler module may be further configured to add the expected time for receiving the DTIM beacon, the duration of the DTIM beacon, and a DCF Interframe Space (PIFS) duration to establish the wake-up time.

The groupcast processing module may be further configured to, after waking up, determine that the group addressed frame is not present. The power management module may be further configured to reenter power save mode after determining that the group addressed frame is not present.

The power management module may be further configured to process the group addressed message and determine a second scheduled wake-up time based at least in part on the interval between successive DTIM beacons. After processing the group addressed message, the power management module may be further configured to reenter the power save mode until the second scheduled wake-up time is reached for processing a subsequent DTIM beacon.

The power management module of the wireless device may be further configured to send an indication that the computing device is entering into power save mode, and after sending the indication, receive the DTIM beacon.

The receive frame management module of the wireless device may be further configured to receive a data frame at an expected time for receiving a beacon frame, and to determine, by the computing device, that the data frame is a beacon frame based at least in part on an analysis of a Media Access Control (MAC) header in the data frame.

In a further example embodiment, there is disclosed a system. The system may include at least one radio, at least one antenna, at least one memory that stores computer-executable instructions, and at least one processor configured to access the at least one memory, wherein the at least one processor is configured to execute the computer-executable instructions to receive, from a wireless access point, a beacon frame. The at least one processor may be further configured to determine an expected time for receiving a Delivery Traffic Indication Message (DTIM) beacon based at least in part on an analysis of the beacon frame. The analysis may include determining an interval between successive DTIM beacons and a counter to the next DTIM beacon. The at least one processor may be further configured to schedule a wake-up time for processing a group addressed message based at least in part on the expected time for receiving the DTIM beacon and a duration of the DTIM beacon. The scheduled wake-up time may include a first scheduled wake-up time. Such a scheduled wake-up time may occur after the DTIM beacon associated with the group addressed message was broadcast.

The at least one processor may be further configured to enter into a power save mode after the scheduling, and wake up at the scheduled wake-up time. The scheduled wake-up time occurs after the DTIM beacon associated with the group addressed message was broadcast. In one embodiment, the at least one processor may be further configured to process, before entering into power save mode, an individually addressed frame. The scheduling may include adding the expected time for receiving the DTIM beacon, the duration of the DTIM beacon, and a DCF Interframe Space (PIFS) duration to establish the wake-up time. The at least one processor may be further configured to, after waking up, determine that the group addressed frame is not present, and reentering power save mode after determining that the group addressed frame is not present.

The at least one processor may be further configured to process the group addressed message and determine a second scheduled wake-up time based at least in part on the interval between successive DTIM beacons. After processing the group addressed message, the at least one processor may be further configured to reenter the power save mode until the second scheduled wake-up time is reached for processing a subsequent DTIM beacon.

The at least one processor may be further configured to send an indication that the computing device is entering into power save mode, and after sending the indication, receive the DTIM beacon. The at least one processor may be further configured to receive a data frame at an expected time for receiving a beacon frame, and determine that the data frame is a beacon frame based at least in part on an analysis of a Media Access Control (MAC) header in the data frame.

In a further example embodiment, there is disclosed a device including at least one radio and at least one antenna. The device may further include means for receiving, from a wireless access point, a beacon frame. The method may also include determining, by the computing device, an expected time for receiving a Delivery Traffic Indication Message (DTIM) beacon based at least in part on an analysis of the beacon frame. The analysis may include determining an interval between successive DTIM beacons and a counter to the next DTIM beacon. The device may further include means for scheduling a wake-up time for processing a group addressed message based at least in part on the expected time for receiving the DTIM beacon and a duration of the DTIM beacon. The scheduled wake-up time may include a first scheduled wake-up time. Such a scheduled wake-up time may occur after the DTIM beacon associated with the group addressed message was broadcast.

The device may further include means for entering into a power save mode after the scheduling, and means for waking up at the scheduled wake-up time. The scheduled wake-up time may occur after the DTIM beacon associated with the group addressed message was broadcast. In one embodiment, the device further include means for processing, before entering into power save mode, an individually addressed frame. The means for scheduling may include means for adding the expected time for receiving the DTIM beacon, the duration of the DTIM beacon, and a DCF Interframe Space (PIFS) duration to establish the wake-up time. The device may also include, after waking up, means for determining that the group addressed frame is not present, and means for reentering power save mode after determining that the group addressed frame is not present.

The device may further include means for processing the group addressed message and means for determining a second scheduled wake-up time based at least in part on the interval between successive DTIM beacons. After processing the group addressed message, the device may further include means for reentering the power save mode until the second scheduled wake-up time is reached for processing a subsequent DTIM beacon.

The device may further include means for sending an indication that the computing device is entering into power save mode, and after sending the indication, means for receiving the DTIM beacon. The device may further include means for receiving a data frame at the expected time for receiving a beacon frame, and means for determining that the data frame is a beacon frame based at least in part on an analysis of a Media Access Control (MAC) header in the data frame.

In a further example embodiment, there is disclosed one or more computer-readable media storing computer-executable instructions that, when executed by at least one processor, configure the at least one processor to perform operations. The operations may include receiving, from a wireless access point, a beacon frame. The operations may also include determining an expected time for receiving a Delivery Traffic Indication Message (DTIM) beacon based at least in part on an analysis of the beacon frame. The analysis may include determining an interval between successive DTIM beacons and a counter to the next DTIM beacon. The operations may further include scheduling a wake-up time for processing a group addressed message based at least in part on the expected time for receiving the DTIM beacon and a duration of the DTIM beacon. The scheduled wake-up time may include a first scheduled wake-up time. Such a scheduled wake-up time may occur after the DTIM beacon associated with the group addressed message was broadcast.

The operations may further include entering into a power save mode after the scheduling, and waking up at the scheduled wake-up time. The scheduled wake-up time occurs after the DTIM beacon associated with the group addressed message was broadcast. In one embodiment, the operations may also include processing, before entering into power save mode, an individually addressed frame. The scheduling may include adding the expected time for receiving the DTIM beacon, the duration of the DTIM beacon, and a DCF Interframe Space (PIFS) duration to establish the wake-up time. The operations may also include, after waking up, determining that the group addressed frame is not present, and reentering power save mode after determining that the group addressed frame is not present.

The operations may further include processing the group addressed message and determining, by the computing device, a second scheduled wake-up time based at least in part on the interval between successive DTIM beacons. After processing the group addressed message, the operations may include reentering the power save mode until the second scheduled wake-up time is reached for processing a subsequent DTIM beacon.

The operations may further include sending an indication that the computing device is entering into power save mode, and after sending the indication, receiving the DTIM beacon. The operations may further include receiving a data frame at the expected time for receiving a beacon frame, and determining that the data frame is a beacon frame based at least in part on an analysis of a Media Access Control (MAC) header in the data frame.

What is claimed is:

1. A wireless device comprising:
a receive frame management module configured to receive a beacon frame from a wireless access point;
a power management module configured to determine an expected time for receiving a Delivery Traffic Indication Message (DTIM) beacon based at least in part on an analysis of the beacon frame, wherein the analysis comprises determining an interval between successive DTIM beacons and a counter to the next DTIM beacon;
a scheduler module configured to schedule a wake-up time for processing a group addressed message based at least in part on the expected time for receiving the DTIM beacon and a duration of the DTIM beacon;
wherein the power management module is further configured to:
enter into a power save mode after the scheduling;
cause to send an indication that the wireless device is entering into power save mode; and
wake up at the scheduled wake-up time, wherein the scheduled wake-up time occurs after the DTIM beacon associated with the group addressed message was broadcast; and
a groupcast processing module configured to:
process the group addressed message; and
process an individually addressed frame before entering into the power save mode; and
wherein the receive frame management module is further configured to, after the indication is sent, receive the DTIM beacon.

2. The wireless device of claim 1, wherein the scheduled wake-up time comprises a first scheduled wake-up time, wherein the DTIM beacon comprises a first DTIM beacon, and
wherein the power management module is further configured to:
determine a second scheduled wake-up time based at least in part on the interval between successive DTIM beacons; and
after processing the group addressed message, reenter the power save mode until the second scheduled wake-up time is reached for processing a subsequent DTIM beacon.

3. The wireless device of claim 1, wherein the scheduler module is further configured to add the expected time for receiving the DTIM beacon, the duration of the DTIM beacon, and a DCF Interframe Space (PIFS) duration to establish the wake-up time.

4. The wireless device of claim 1, wherein the receive frame management module is further configured to receive a data frame at an expected time for receiving a beacon frame, and wherein the receive frame management module is further configured to determine that the data frame is a beacon frame based at least in part on an analysis of a Media Access Control (MAC) header in the data frame.

5. The wireless device of claim 1, wherein the groupcast processing module is further configured to, after waking up, determine that the group addressed frame is not present, and wherein the power management module is further configured to reenter power save mode after determining that the group addressed frame is not present.

6. A method comprising:
receiving, by a computing device from a wireless access point, a beacon frame;
determining, by the computing device, an expected time for receiving a Delivery Traffic Indication Message (DTIM) beacon based at least in part on an analysis of the beacon frame, wherein the analysis comprises determining an interval between successive DTIM beacons and a counter to the next DTIM beacon;
scheduling, by the computing device, a wake-up time for processing a group addressed message based at least in part on the expected time for receiving the DTIM beacon and a duration of the DTIM beacon;
entering, by the computing device, into a power save mode after the scheduling;
causing to send, by the computing device, an indication that the computing device is entering into power save mode;
determining, by the computing device, the DTIM beacon received after sending the indication;

waking up, by the computing device, at the scheduled wake-up time, wherein the scheduled wake-up time occurs after the DTIM beacon associated with the group addressed message was broadcast;

processing, by the computing device, the group addressed message; and processing, by the computing device before entering into power save mode, an individually addressed frame.

7. The method of claim 6, wherein the scheduled wake-up time comprises a first scheduled wake-up time, wherein the method further comprises:

determining, by the computing device, a second scheduled wake-up time based at least in part on the interval between successive DTIM beacons; and after processing the group addressed message, reentering, by the computing device, the power save mode until the second scheduled wake-up time is reached for processing a subsequent DTIM beacon.

8. The method of claim 6, wherein the scheduling comprises adding, by the computing device, the expected time for receiving the DTIM beacon, the duration of the DTIM beacon, and a DCF Interframe Space (PIFS) duration to establish the wake-up time.

9. The method of claim 6, further comprising:

receiving, by the computing device, a data frame at an expected time for receiving a beacon frame; and determining, by the computing device, that the data frame is a beacon frame based at least in part on an analysis of a Media Access Control (MAC) header in the data frame.

10. The method of claim 6, further comprising:

after waking up, determining, by the computing device, that the group addressed frame is not present; and reentering power save mode after determining that the group addressed frame is not present.

11. A system comprising:

at least one radio;

at least one antenna;

at least one memory that stores computer-executable instructions; and at least one processor configured to access the at least one memory, wherein the at least one processor is configured to execute the computer-executable instructions to:

receive, from a wireless access point, a beacon frame;

determine an expected time for receiving a Delivery Traffic Indication Message (DTIM) beacon based at least in part on an analysis of the beacon frame, wherein the analysis comprises determining an interval between successive DTIM beacons and a counter to the next DTIM beacon;

schedule a wake-up time for processing a group addressed message based at least in part on the expected time for receiving the DTIM beacon and a duration of the DTIM beacon;

enter into a power save mode after the scheduling;

cause to send an indication that the computing device is entering into power save mode;

identify the DTIM beacon received after sending the indication;

wake up at the scheduled wake-up time, wherein the scheduled wake-up time occurs after the DTIM beacon associated with the group addressed message was broadcast, and execute the computer-executable instructions to process the group addressed message and process an individually addressed frame before entering into power save mode.

12. The system of claim 11, wherein the scheduled wake-up time comprises a first scheduled wake-up time, wherein the at least one processor is further configured to execute the computer-executable instructions to:

determine a second scheduled wake-up time based at least in part on the interval between successive DTIM beacons; and after processing the group addressed message, reenter the power save mode until the second scheduled wake-up time is reached for processing a subsequent DTIM beacon.

13. The system of claim 11, wherein the computer-executable instructions for scheduling further comprise computer-executable instructions for adding the expected time for receiving the DTIM beacon, the duration of the DTIM beacon, and a DCF Interframe Space (PIFS) duration to establish the wake-up time.

14. The system of claim 11, the at least one processor further configured to execute the computer-executable instructions to:

receive a data frame at an expected time for receiving a beacon frame; and determine that the data frame is a beacon frame based at least in part on an analysis of a Media Access Control (MAC) header in the data frame.

15. The system of claim 11, the at least one processor further configured to execute the computer-executable instructions to:

after waking up, determine that the group addressed frame is not present; and reenter power save mode after determining that the group addressed frame is not present.

* * * * *